United States Patent
Jimenez Pino et al.

(10) Patent No.: US 9,923,470 B2
(45) Date of Patent: Mar. 20, 2018

(54) HIGH VOLTAGE PRE-CHARGE SYSTEM

(71) Applicant: LEAR CORPORATION, Southfield, MI (US)

(72) Inventors: Rafael Jimenez Pino, Valls (ES); Ricardo Riazor Gil, Valls (ES)

(73) Assignee: Lear Corporation, Southfield, MI (US)

( * ) Notice: Subject to any disclaimer, the term of this patent is extended or adjusted under 35 U.S.C. 154(b) by 265 days.

(21) Appl. No.: 14/858,574

(22) Filed: Sep. 18, 2015

(65) Prior Publication Data
US 2017/0085177 A1    Mar. 23, 2017

(51) Int. Cl.
| | | |
|---|---|---|
| *H01H 47/00* | (2006.01) | |
| *H02M 3/335* | (2006.01) | |
| *H02J 1/06* | (2006.01) | |
| *H02J 7/34* | (2006.01) | |
| *H02M 1/36* | (2007.01) | |

(52) U.S. Cl.
CPC .............. *H02M 3/335* (2013.01); *H02J 1/06* (2013.01); *H02J 7/34* (2013.01); *H02M 1/36* (2013.01)

(58) Field of Classification Search
CPC ............. H02M 1/36; H02M 3/335; H02J 7/00
USPC ........................................................ 307/125
See application file for complete search history.

(56) References Cited

U.S. PATENT DOCUMENTS

| | | |
|---|---|---|
| 5,003,192 A | 3/1991 | Beigel |
| 6,181,101 B1 | 1/2001 | Arai et al. |
| 6,191,558 B1 | 2/2001 | Arai et al. |
| 6,376,928 B1 | 4/2002 | Saka et al. |
| 6,614,668 B2 | 9/2003 | Coffey et al. |
| 6,760,235 B2 | 7/2004 | Lin et al. |
| 6,891,705 B2 | 5/2005 | Bryan |
| 6,898,093 B2 | 5/2005 | Ambo et al. |
| 7,271,990 B2 | 9/2007 | Bryan |
| 7,742,317 B2 | 6/2010 | Chen et al. |
| 7,990,123 B2 | 8/2011 | Lim et al. |
| 8,203,810 B2 | 6/2012 | Bryan et al. |
| 8,453,814 B2 | 6/2013 | Gambach et al. |
| 8,476,524 B2 | 7/2013 | Sella et al. |
| 8,570,699 B2 | 10/2013 | Shaya et al. |
| 8,670,247 B2 | 3/2014 | Mase et al. |
| 8,742,718 B2 | 6/2014 | Sugiyama et al. |
| 8,805,629 B2 | 8/2014 | Yin et al. |
| 8,896,263 B2 | 11/2014 | Riggio et al. |
| 9,440,551 B2 * | 9/2016 | Thommes ............ H02H 11/005 |

(Continued)

FOREIGN PATENT DOCUMENTS

| | | |
|---|---|---|
| DE | 60118 293 T2 | 12/2006 |
| DE | 102015203912 A1 | 9/2015 |

(Continued)

*Primary Examiner* — Jared Fureman
*Assistant Examiner* — Duc M Pham
(74) *Attorney, Agent, or Firm* — Fishman Stewart PLLC

(57) ABSTRACT

The present disclosure includes a high voltage electrical system that may include a power source, a power source control module that may be electrically connected to the power source, and a controller. The power source control module may include a switch and a converter. The converter may be disposed electrically in parallel with the switch. The controller may be configured to control operation of the switch and the converter. The controller may be configured to selectively electrically connect the power source with an electrical load via the switch and the converter.

20 Claims, 4 Drawing Sheets

(56) References Cited

U.S. PATENT DOCUMENTS

| | | |
|---|---|---|
| 2004/0048142 A1 | 3/2004 | Marusak et al. |
| 2011/0309809 A1 | 12/2011 | Rao et al. |
| 2012/0182662 A1 | 7/2012 | Hsueh |
| 2012/0299377 A1 | 11/2012 | Masuda et al. |
| 2013/0175972 A1* | 7/2013 | Akiyama ............ H01M 8/0494 |
| | | 320/101 |
| 2014/0021916 A1 | 1/2014 | Bilezkjlan et al. |
| 2015/0001857 A1* | 1/2015 | Sekiguchi ................ B60L 7/10 |
| | | 290/38 C |
| 2015/0084404 A1 | 3/2015 | Hashim et al. |
| 2015/0251542 A1 | 9/2015 | Mensah-Brown et al. |

FOREIGN PATENT DOCUMENTS

| | | |
|---|---|---|
| EP | 1369305 A2 | 12/2003 |
| EP | 1335471 B1 | 1/2011 |
| EP | 2457779 A1 | 5/2012 |
| WO | WO-2015/124161 A1 | 8/2015 |

* cited by examiner

HIGH VOLTAGE PRE-CHARGE SYSTEM

TECHNICAL FIELD

The present disclosure relates to electrical components and electrical power systems, including vehicle high voltage systems.

BACKGROUND

In certain high voltage systems, such as those that may be present in vehicles, it may be desirable to limit a voltage difference between different components of an electrical system. For example, a power source may be configured to provide energy and/or electrical power at a relatively high voltage. Electrical components that may be connected to such a power source may not be compatible with large voltage differences (e.g., from 0 volts to several hundred volts) and/or corresponding high inrush currents. Conventional designs may include a relay and resistor to limit inrush currents that may result from voltage differences between different electrical components when the electrical components are connected to each other. However, such relays and resistors may be relatively large (e.g., in volume) and/or heavy to accommodate high voltages.

SUMMARY

In embodiments, a high voltage electrical system may comprise a power source and/or a power source control module. The power source control module may be electrically connected to the power source. The power source control module may comprise a plurality of switches that may be configured to electrically connect the power source with an electrical load. The power source control module may include a DC/DC converter that may be disposed electrically in parallel with the plurality of switches. The DC/DC converter may be configured to electrically connect the power source with said electrical load. The power source control module may include to controller that may be configured to control operation of the plurality of switches and the DC/DC converter. In embodiments, the controller may be configured to selectively electrically connect the power source module with said electrical load via the plurality of switches and the DC/DC converter.

In embodiments, a method of controlling a power source selectively connected with an electrical load may include providing a power source control module that may be configured to control the power source. In embodiments, the power source control module may comprise an electrical switch, a DC/DC converter that may be disposed electrically in parallel with the electrical switch, and/or a controller that may be configured to control operation of the electrical switch and the DC/DC converter. The method may include determining a voltage of the power source, determining an initial voltage of said electrical load; connecting an input of the DC/DC converter to the power source; controlling, via the controller, an output voltage of the DC/DC converter such that an initial value of the output voltage is within a first predetermined range of said initial voltage of said electrical load; providing the output voltage of the DC/DC converter to said electrical load; monitoring a current voltage of said electrical load; and/or increasing, via the controller, the output voltage of the DC/DC converter until the actual voltage of said electrical load is within a second predetermined range of the voltage of the power source. In embodiments, the DC/DC converter may limit the current provided to said electrical load until the actual voltage of said electrical load is within the second predetermined range of the power source voltage.

DETAILED DESCRIPTION

Reference will now be made in detail to embodiments of the present disclosure, examples of which are described herein and illustrated in the accompanying drawings. While the disclosure will be described in conjunction with embodiments and/or examples, it will be understood that they are not intended to limit the present disclosure to these embodiments and/or examples. On the contrary, the present disclosure is intended to cover alternatives, modifications and equivalents, which may be included within the spirit and scope of the present disclosure.

Figure 1:
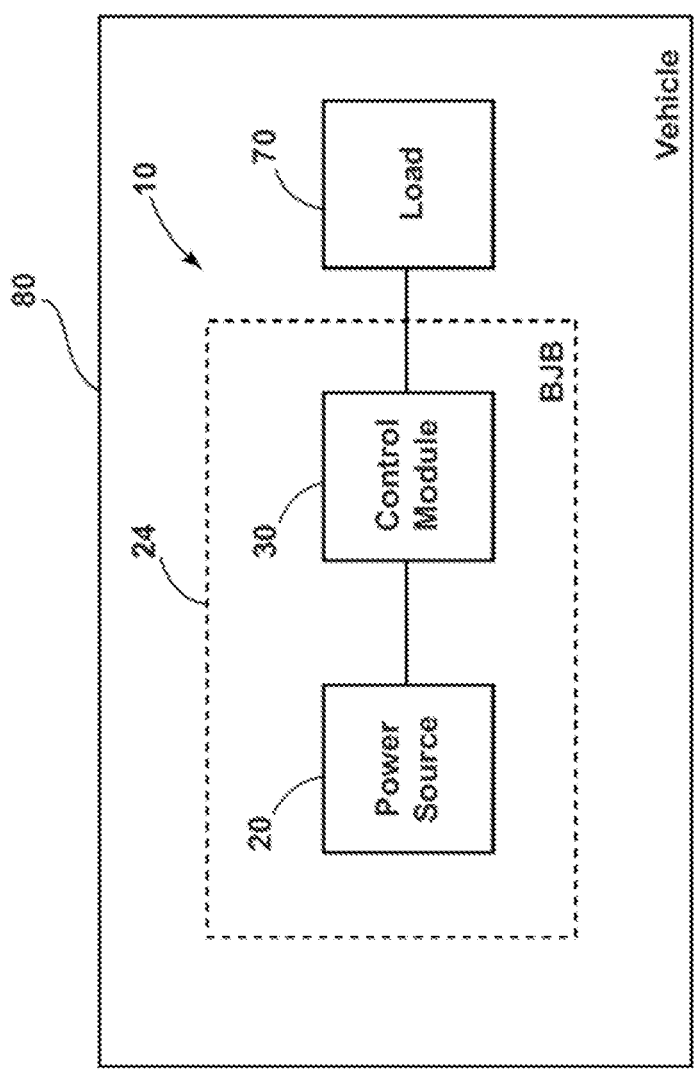
FIG. 1 is a diagrammatic view of an embodiment of a high voltage electrical power system in accordance with teachings of the present disclosure.

In embodiments, such as generally illustrated in FIG. 1 an electrical system 10 may be a high voltage electrical system, may include a power source 20, and/or may include a power source control module 30. Electrical system 10 may be connected to an electrical load 70. Electrical load 70 may include a high voltage network and/or may be referred to herein as high voltage network 70, but is not limited to a high voltage network. In embodiments, electrical system 10 and/or electrical load 70 may be disposed at least partially in a vehicle 80. In embodiments, power source 20 and powers source control module 10 may be disposed in a common housing 24, such as a battery junction box (BJB).

Figure 2:
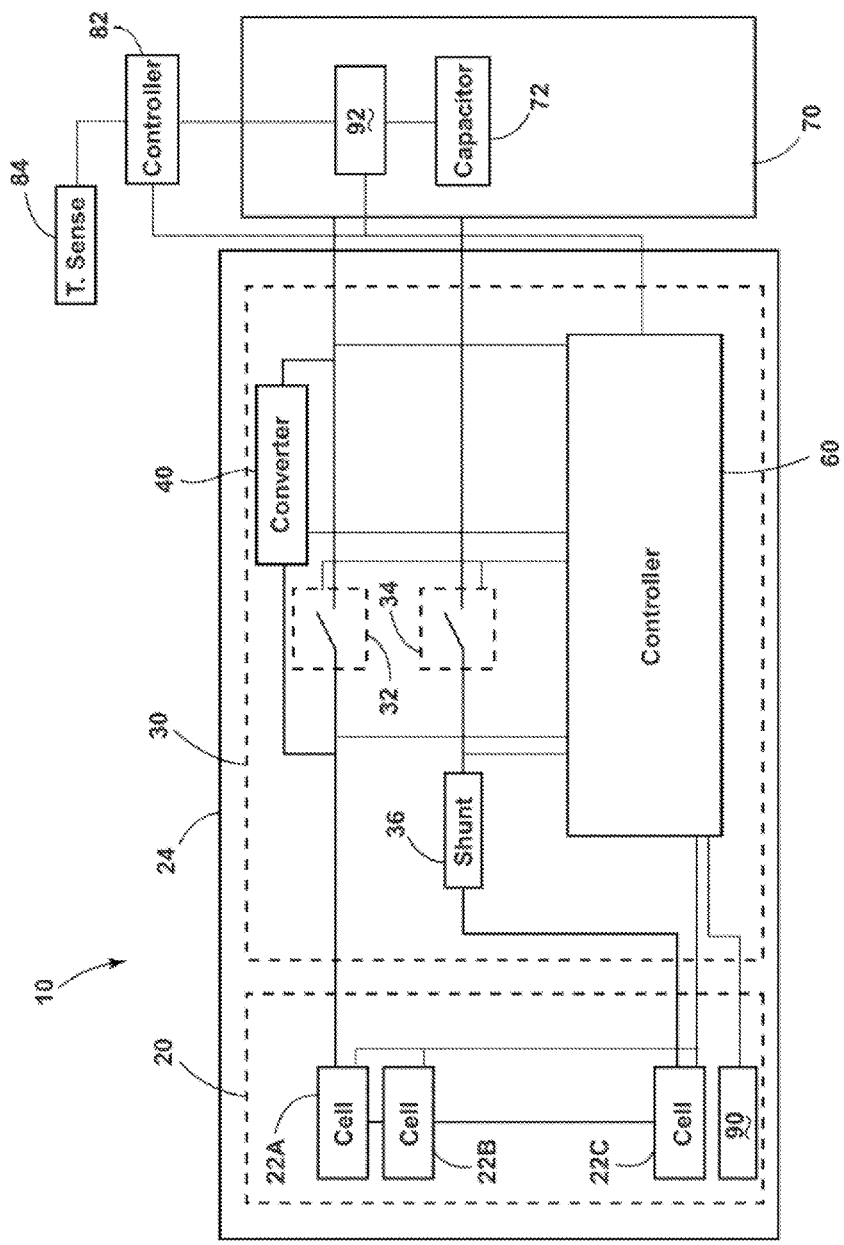
FIG. 2 is a diagrammatic view of an embodiment of a high voltage electrical power system in accordance with teachings of the present disclosure.

In embodiments, such as generally illustrated in FIG. 2, power source 20 may be configured to provide energy and/or electrical power to load 70 via power source control module 30. In embodiments, power source 20 may include one or more of a variety of shapes, sizes, configurations, and/or materials. For example, and without limitation, power source 20 may include one or more batteries that may include one or more cells (e.g., cells 22A, 22B, 22C). Power source 20 may be configured to provide electrical energy at a certain voltage and/or within a certain range of voltages. For example, and without limitation, power source 20 may be configured to provide electrical energy at or about 400 volts. In other embodiments, power source 20 may be configured to provide electrical energy at lower voltages, such as 12 volts (or even lower), and/or higher voltages, such as, for example, 100 volts, 500 volts, 850 volts, 2000 volts, 3000 volts, or even higher.

In embodiments, power source control module 30 may be configured to control a flow of energy between power source 20 and load 70. Power source control module 30 may include one or more electrical switches 32, 34, an electrical converter 40, such as a DC/DC (direct, current to direct current) converter, a controller 60, and/or one or more other electrical components.

In embodiments, such as generally illustrated in FIG. 2, switches 32, 34 may be disposed electrically (e.g., in an electrical path and/or circuit) between power source 20 and load 70, and may be configured to selectively connect (e.g., in closed positions) and/or disconnect (e.g., in open positions) power source 20 and load 70. In embodiments, switches 32, 34 may connect and/or disconnect power source 20 and load 70 (e.g., transition between open and closed positions) very quickly, which may include transitioning almost instantaneously. In embodiments, switches 32, 34 may include one or more of a variety of configurations and may include, for example, electrical relays and/or contractors. In embodiments, there may be an initial voltage difference between a power source voltage and a load voltage. If the difference in voltage is greater than a predetermined amount, instantaneously connecting power source 20 with load 70 may cause load 70 to receive a large inrush current from power source 20, which could cause a malfunction of and/or cause damage to components of load 70. In embodiments, switches 32, 34 may not be configured for large voltage differences and/or large inrush currents, and instantaneously connecting power source 20 with load 70 may cause a malfunction of and/or damage to switches 32, 34. In embodiments, the initial voltage difference may be about at least 500 volts, at least 800 volts, or may be even greater. In embodiments, electrical system 10 and/or power source control module 30 may include a shunt 36 (or other current sensing element), that may, for example, be disposed electrically between power source 20 and switch 34.

Figure 3:
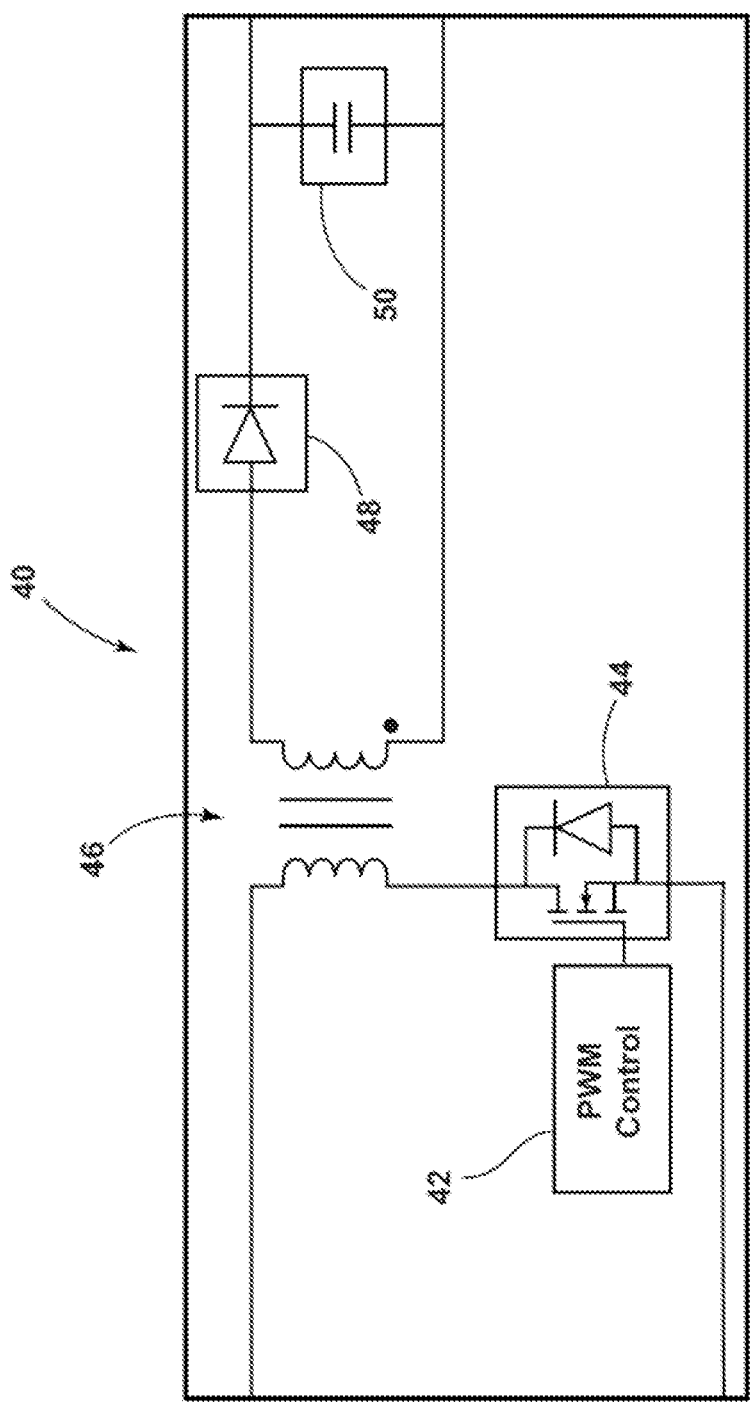
FIG. 3 is a diagrammatic view of an embodiment of a converter in accordance with teachings of the present disclosure.

In embodiments, such as generally illustrated in FIGS. 2 and 3, converter 40 may be configured for pre-charging load 70, which may include limiting and/or reducing the voltage difference between power source 20 and load 70. Additionally or alternatively, converter may be configured limit the current provided to load 70 and/or provide current to load 70 according to a predetermined profile until load 70 has been pre-charged. Converter 40 may be disposed electrically in parallel with one or more of switches 32, 34, which may allow converter 40 to provide an alternative electrical connection between power source 20 and load 70. For example, and without limitation, if one or more of switches 32, 34 is open, converter 40 may still be capable of providing energy from power source 20 to load 70. In embodiments, converter 40 may be configured to receive energy from power source 20 at a power source voltage and output a reduced voltage to load 70 (e.g., converter 40 may be configured as a buck converter). For example and without limitation, converter 40 may receive high voltage energy from power source 20 (e.g., at 400 volts or more) and may reduce/step down that high voltage to a voltage that is closer to and/or substantially the same as the load voltage.

In embodiments, converter 40 may include one or more of a variety of configurations. For example, and without limitation, as generally illustrated in FIG. 3, converter 40 may comprise a DC/DC converter, which may include an a pulse width modulation (PWM) control module 42, a transistor 44 (e.g., a metal-oxide-semiconductor field-effect transistor (MOSFET)), a transformer 46, a rectifier 48, a capacitor 50, and/or other desired components.

In embodiments, controller 60 may include an electronic controller and/or include an electronic processor, such as a programmable microprocessor and/or microcontroller. In embodiments, controller 60 may include, for example, an application specific integrated circuit (ASIC). Controller 60 may include a central processing unit (CPU), memory, and/or an input/output (I/O) interface. Controller 60 may be configured to perform various functions, including those described in greater detail herein, with appropriate programming instructions and/or code embodied in software, hardware, and/or other medium.

In embodiments, controller 60 may be configured to control operation of switches 32, 34 and/or converter 40. For example, and without limitation, controller 60 may be configured to control the Output of converter 40 (e.g., the voltage of energy provided to load 70). In embodiments, controller 60 may be configured to increase over time the voltage provided from power source 20 to load 70. In embodiments, controller 60 may control converter 40 such that the output of converter 40 begins at an initial voltage that is less than the power source voltage, within a first predetermined range of the load voltage, and/or substantially the same as the load voltage. Over a period of time, controller 60 may cause converter 40 to increase the output voltage provided to load 70 until the load voltage is within a second predetermined range of and/or substantially the same as the power source voltage. The first and/or second predetermined ranges may include and/or correspond to, for example, and without limitation, a voltage rating of load 70 (e.g., of a capacitor 72 of load) and/or a percentage of the power source voltage.

In embodiments, controller 60 may be configured to determine the power source voltage via a power source sensor 90 that may be connected to power source 20 and/or may be integrated, with power source 20. Controller 60 may be connected to and/or in communication with power source sensor 90. In embodiments, power source sensor 90 may be configured to sense a voltage of power source 20 (e.g., may include a voltage sensor), sense an electrical current of power source 20 (e.g., may include a current sensor), and/or sense one or more other electrical characteristics of power source 20 (e.g., power source sensor 90 may include an electrical characteristic sensor).

In embodiments, controller 60 may be configured to determine the load voltage via a load sensor 92 that may be connected to load 70 and/or a capacitor 72 of load 70. Controller 60 may be connected to and/or in communication with load sensor 90. Load sensor 92 may be disposed within and/or connected to load 70. Load sensor 92 may be configured to sense a voltage of load 70 and/or capacitor 72 (e.g., may include a voltage sensor), sense an electrical current of load 70 and/or capacitor 72 (e.g., may include a current sensor), sense a state of charge of load 70 and/or capacitor 72, and/or sense one or more other electrical characteristics of load 70 and/or capacitor 72 (e.g., load sensor 92 may include an electrical characteristic sensor). In embodiments, controller 60 may be connected to power source sensor 90 and/or load sensor 92. In embodiments, power source sensor 90, load sensor 92, and/or controller 60 may be connected to a second controller 82. For example, and without limitation, second controller 82 may comprise a vehicle controller.

In embodiments, controller 60 may cause converter 40 to increase its output voltage by a relatively large amount (e.g., a difference between the load voltage and the power source voltage may, at least initially, be relatively large). For example, and without limitation, the load voltage may be about 0 volts, the power source voltage may be about 400 volts, and controller 60 may cause the output of converter 40 to increase from 0 volts to about 400 volts over a period of time. The period of time may be relatively short, and may be, for example, less than a few second (e.g., about one second, two seconds, etc.). In some embodiments, the period of time may be about 200-300 milliseconds, or even less. In embodiments, the power source voltage may be at least 550 volts, at least 850 volts, or even higher, and controller 60 may continue to increase the output voltage of converter 40 until the load voltage reaches such higher voltages.

In embodiments, the period of time during which the controller 60 may cause the converter 40 to completely ramp up/pre-charge the load (e.g., the rate of pre-charge), may depend on one or more of a number of factors/parameters. For example, and without limitation, the rate of pre-charge may depend one or more parameters, which may include a power source voltage, a power source current, a converter current (e.g., at a primary winding of transformer 46), a load voltage, the state of switches 32, 34 (e.g., open or closed), vehicle conditions, battery temperature, and/or ambient temperature. In embodiments, the pre-charge rate (e.g., volts per unit time) that may be dictated by controller 60 to converter 40 may depend on the difference between the load voltage and the power source voltage. For example, if the load voltage is greater than 0 volts, then the pre-charge rate may be less than if the load voltage is at or about 0 volts.

In embodiments, controller 60 may determine the pre-charge rate at least partially according to ambient temperature. For example, and without limitation, if the ambient temperature is below a certain value (e.g., 0 degrees Celsius), controller 60 may include a limit on the pre-charge rate that is lower than for higher ambient temperatures. Limiting the pre-charge rate at lower temperatures may accommodate for electrical components of load 70 that may include lower voltage-change (e.g., inrush current) tolerances at lower temperatures. In embodiments, controller 60 may determine a first pre-charge rate if the ambient temperature is within a first temperature range and may determine a second pre-charge rate if the ambient temperature is within a second temperature range. In embodiments, the first temperature range may be lower than and/or not overlap with the second temperature range (e.g., each temperature in the first temperature range may be lower than each temperature in the second temperature range). In embodiments, the first pre-charge rate may be less than the second pre-charge rate (e.g., a slower pre-charge rate may be used for lower temperatures). In embodiments, controller 60 may be configured to communicate with a temperature sensor 84, such as via second controller 82, to determine temperatures, such as an ambient temperature. Temperature sensor 84 may be included in power source control module 30, may be disposed in vehicle 80, and/or may be connected to vehicle 80.

In embodiments, load 70 may include components that are not high voltage components. For example, and without limitation, load 70 may include one or more lower voltage components, such as 12-volt components. In such embodiments, converter 40 may be configured to pre-charge such components and/or maintain an output voltage of about 12 volts (e.g. not increase its output voltage up to the power source voltage). In embodiments, converter 40 may be configured to provide such a low voltage output in addition to (e.g., simultaneously) and/or as an alternative to (e.g., switch between) high voltage pre-charging.

In embodiments, a method of controlling electrical system 10, which may comprise power source 20 selectively connected with electrical load 70, may include determining a voltage of the power source 20 (e.g., via power source sensor 90), determining an initial voltage of electrical load 70 (e.g., via load sensor 92), and/or connecting an input of converter 40 to the power source 20. The method may include controlling, via controller 60, an output voltage of converter 40 such that an initial value of the output voltage is within a first predetermined range of said initial voltage of electrical load 70. The method may include providing the output voltage of the converter to electrical load 70, monitoring an actual voltage of said electrical load (e.g., via load sensor 92), and/or increasing, via controller 60, the output voltage of converter 40 until the actual voltage of electrical load 70 is within a second predetermined range of the voltage of the power source.

In embodiments, the method may include closing an electrical switch if the actual voltage of said electrical load is within the second predetermined range of the voltage of the power source. In embodiments, controller 60 may increase the output voltage of converter 40 according to at least one parameter. The at least one parameter may include, for example, an ambient temperature. In embodiments, controller 60 may increase the output voltage of converter 40 at a first rate if the ambient temperature is within a first range of ambient temperatures and may increase the output voltage of the converter 40 at a second rate if the ambient temperature is within a second range of ambient temperatures. In embodiments, each ambient temperature of the first range of ambient temperatures may be lower than each ambient temperature of the second range of ambient temperatures, and the first rate may be less than the second rate.

Figure 4:
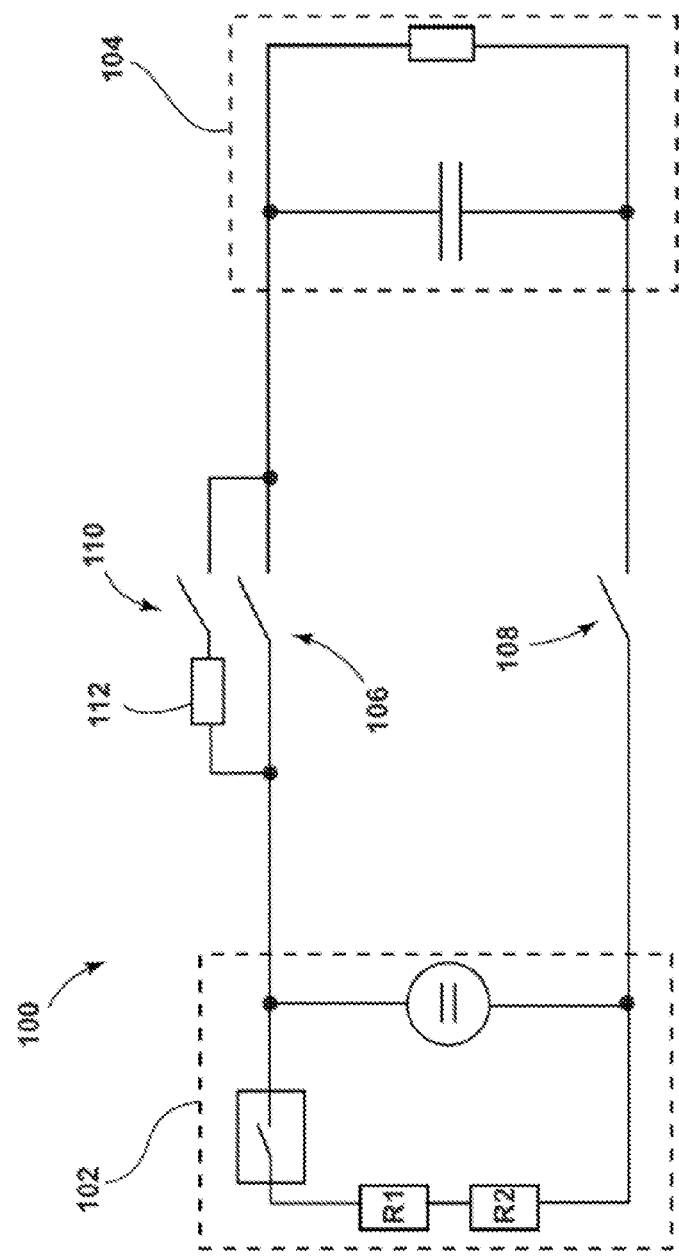
FIG. 4 is a diagrammatic view of a conventional electrical system.

In embodiments, power source control module 30 may be relatively small (e.g., volume, mass, etc.) relative to previous designs (e.g., conventional design 100 generally illustrated in FIG. 4). Conventional design 100 may include a power source 102, a load 104, switches 106, 108, a relay 110, and a resistor 112. As the voltage of power source 102 increases, the size of a relay 110 and/or a resistor 112 in conventional design 100 may need to increase to accommodate larger voltages. Such increases in size may not be feasible for certain environments, such as vehicles, or other environments that may involve size and/or weight limitations. For example, and without limitation, relays and resistors capable of operating at 850 volts or 3000 volts, even if available, may be too large for certain environments/applications. Also, the cost of relays and/or resistors with such high operating tolerances may be significantly more expensive. In contrast, converter 40 of power source control module 30 may permit embodiments of electrical system 10 to operate with a very large range of voltages (e.g., up to and/or exceeding thousands of volts) without increasing its size. For example, and without limitation, power source control module 30 may be smaller than the combination of the relay 110 and resistor 112 of conventional design 100, and conventional design 100 may only be capable of operating with voltages up to about 400 volts. In contrast, power source control module 30 may be capable of operating with voltages up to and/or exceeding 3000 volts.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment,"

or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. The use of "connected" or "connection" should be construed broadly and is intended to include, without limitation, direct or indirect physical connection and/or electrical connection (e.g., wired and/or wireless). It is intended that all matter contained in the above description or shown in the accompanying drawings shall be interpreted as illustrative only and not limiting. Changes in detail or structure may be made without departing from the present disclosure as defined in the appended claims.

What is claimed is:

1. A power source control module comprising:
    a switch configured to electrically connect a power source with an electrical load;
    an electrical converter disposed electrically in parallel with the switch, the electrical converter configured to electrically connect said power source with said electrical load; and
    a controller configured to control operation of the switch and the electrical converter;
    wherein the controller is configured to selectively electrically connect said power source with said electrical load via the switch and the electrical converter; and the controller is configured to determine a pre-charge rate according to an ambient temperature.

2. The power source control module of claim 1, wherein said power source is configured to provide a voltage of at least 800 volts.

3. The power source control module of claim 1, wherein said power source is configured to provide a voltage of at least 2000 volts.

4. The power source control module of claim 1, wherein the electrical converter includes a DC/DC converter configured to step down a voltage of said power source and provide the stepped down voltage to said electrical load.

5. The power source control module of claim 4, wherein the controller is configured to increase the stepped down voltage provided to said electrical load until a voltage of said electrical load is within a predetermined range of the voltage of the power source.

6. The power source control module of claim 5, wherein the controller is configured to close the switch when said voltage of said electrical load is substantially equal to the voltage of the power source.

7. The power source control module of claim 5, wherein an initial voltage difference between said voltage of said electrical load and the voltage of the power source is at least 500 volts.

8. The power source control module of claim 5, wherein an initial voltage difference between said voltage of said electrical load and the voltage of said power source is at least 800 volts.

9. The power source control module of claim 7, wherein the controller is configured to increase said voltage of said electrical load such that it is within the predetermined range of the voltage of said power source in about 2 seconds or less.

10. The power source control module of claim 7, wherein the controller is configured to increase said voltage of said electrical load such that it is within the predetermined range of the voltage of said power source in less than 300 milliseconds.

11. The power source control module of claim 1, wherein the controller, the electrical converter, and the switch are disposed within a common housing with said power source.

12. The power source control module of claim 1, wherein the controller is in communication with an electrical characteristic sensor of said electrical load and an electrical characteristic sensor of said power source.

13. The power source control module of claim 12, wherein said electrical characteristic sensor of said electrical load includes a voltage sensor connected to a capacitor of said electrical load; and the electrical characteristic sensor of said power source includes an electrical current sensor configured to measure an electrical current of said power source.

14. A method of controlling an electrical system, the method comprising:
    providing a power source control module configured to control a power source, the power source control module comprising:
        an electrical switch configured to selectively connect said power source with an electrical load;
        a DC/DC converter disposed electrically in parallel with the electrical switch; and
        a controller configured to control operation of the electrical switch and the DC/DC converter, the controller configured to determine a pre-charge rate according to an ambient temperature; and
    determining a voltage of said power source;
    determining an initial voltage of said electrical load;
    connecting an input of the DC/DC converter to said power source;
    controlling, via the controller, an output voltage of the DC/DC converter such that an initial value of the output voltage is within a first predetermined range of said initial voltage of said electrical load;
    providing the output voltage of the DC/DC converter to said electrical load;
    monitoring an actual voltage of said electrical load; and
    increasing, via the controller, the output voltage of the DC/DC converter until the actual voltage of said electrical load is within a second predetermined range of the voltage of the power source.

15. The method of claim 14, further comprising closing the electrical switch if the actual voltage of said electrical load is within the second predetermined range of the voltage of said power source.

16. The method of claim 14, wherein the controller increases the output voltage of the DC/DC converter according to at least one parameter.

17. The method of claim 16, wherein the at least one parameter includes an ambient temperature.

18. A method of controlling an electrical system, the method comprising:
   providing a power source control module configured to control a power source, the power source control module comprising:
      an electrical switch configured to selectively connect said power source with an electrical load;
      a DC/DC converter disposed electrically in parallel with the electrical switch; and
      a controller configured to control operation of the electrical switch and the DC/DC converter;
   determining a voltage of said power source;
   determining an initial voltage of said electrical load;
   connecting an input of the DC/DC converter to said power source;
   controlling, via the controller, an output voltage of the DC/DC converter such that an initial value of the output voltage is within a first predetermined range of said initial voltage of said electrical load;
   providing the output voltage of the DC/DC converter to said electrical load;
   monitoring an actual voltage of said electrical load; and
   increasing, via the controller, the output voltage of the DC/DC converter until the actual voltage of said electrical load is within a second predetermined range of the voltage of the power source
   wherein the controller increases the output voltage of the DC/DC converter at a first rate if an ambient temperature is within a first range of ambient temperatures and increases the output voltage of the DC/DC converter at a second rate if the ambient temperature is within a second range of ambient temperatures.

19. The method of claim 18, wherein each ambient temperature of the first range of ambient temperatures is lower than each ambient temperature of the second range of ambient temperatures, and the first rate is less than the second rate.

20. The method of claim 19, wherein said power source and the power source control module are disposed within a common housing.

* * * * *